US012227394B2

(12) United States Patent
Nielsen

(10) Patent No.: US 12,227,394 B2
(45) Date of Patent: Feb. 18, 2025

(54) SAFETY DEVICE

(71) Applicant: CRH Concrete A/S, Viby Sjælland (DK)

(72) Inventor: Esben Nielsen, Aabenraa (DK)

(73) Assignee: CRH Concrete A/S (DK)

( * ) Notice: Subject to any disclaimer, the term of this patent is extended or adjusted under 35 U.S.C. 154(b) by 144 days.

(21) Appl. No.: 17/907,873

(22) PCT Filed: Nov. 4, 2021

(86) PCT No.: PCT/DK2021/050324
§ 371 (c)(1),
(2) Date: Aug. 29, 2022

(87) PCT Pub. No.: WO2022/144062
PCT Pub. Date: Jul. 7, 2022

(65) Prior Publication Data

US 2023/0093145 A1 Mar. 23, 2023

(30) Foreign Application Priority Data

Dec. 30, 2020 (DK) .......................... PA 2020 01471

(51) Int. Cl.
*E04G 21/14* (2006.01)
*B66C 1/66* (2006.01)
*E04G 21/32* (2006.01)

(52) U.S. Cl.
CPC ............ *B66C 1/666* (2013.01); *E04G 21/142* (2013.01); *E04G 21/3219* (2013.01); *E04G 21/3276* (2013.01)

(58) Field of Classification Search
CPC .............. E04G 21/142; E04G 21/3219; E04G 21/3276; B66C 1/666

(Continued)

(56) References Cited

U.S. PATENT DOCUMENTS 8,800,220 B1 * 8/2014 Francies, III ........... E04G 15/04 249/91
9,151,065 B1 * 10/2015 Francies, III ......... E04G 21/142

(Continued)

FOREIGN PATENT DOCUMENTS

EP 1083273 A2 3/2001
JP 2017172233 A 9/2017

(Continued)

*Primary Examiner* — Paola Agudelo
(74) *Attorney, Agent, or Firm* — Elmore Patent Law Group, P.C.; Joseph C. Zucchero; Carolyn S. Elmore

(57) ABSTRACT

A safety device is provided. The safety device (100) is for securing an individual to a concrete element (2) of a structure during construction work. The concrete element (2) is of the type comprising a concrete body (4) having one or more lifting pins (6) embedded in respective lifting pin holes (8) in said body. The safety device in the orientation intended during use comprises: —an anchoring element (10); and —a top element (12); wherein said anchoring element (10) comprises engagement means (14) configured to releasably engage with the head of a lifting pin of the type comprising a longitudinal stem (18) and a head (20) arranged at an upper end of said stem, said head (20) of said lifting pin (6) is having a larger extension, compared to said stem, in a transversal direction Y; so as to enable said anchoring element (10) and said lifting pin (6) to shift configuration between an engaged configuration with each other and a disengaged configuration and vice versa; wherein said anchoring element (10) comprises a first fastening means (22) configured to be connected to said top element (12); wherein said top element (12) comprises a second fastening means (24) configured to be connected to said anchoring element (10); wherein said safety device comprises fixation means (26) for fixing a safety line thereto.

31 Claims, 10 Drawing Sheets

(58) Field of Classification Search
USPC .......................................................... 52/125.5
See application file for complete search history.

(56) References Cited

U.S. PATENT DOCUMENTS

| | | | | |
|---|---|---|---|---|
| 9,702,139 | B2 * | 7/2017 | Espinosa | B28B 23/0056 |
| 2011/0000148 | A1 * | 1/2011 | Arteon | E04G 21/142 52/125.5 |
| 2011/0133940 | A1 * | 6/2011 | Margalit | E06B 3/66366 52/204.593 |
| 2014/0096459 | A1 * | 4/2014 | Recker | E04B 1/41 52/125.5 |
| 2019/0048532 | A1 * | 2/2019 | Smith | B66C 1/00 |
| 2020/0130228 | A1 * | 4/2020 | Tarrant | B66C 23/26 |
| 2020/0346901 | A1 * | 11/2020 | Miller | B65G 7/12 |
| 2020/0392796 | A1 * | 12/2020 | Reddy | E21B 15/003 |
| 2022/0025715 | A1 * | 1/2022 | Saebo | E21B 19/14 |
| 2022/0034111 | A1 * | 2/2022 | Thompson | E04G 21/147 |
| 2023/0235582 | A1 * | 7/2023 | Jablonsky | E04G 21/142 52/125.4 |

FOREIGN PATENT DOCUMENTS

| | | | |
|---|---|---|---|
| WO | 2006042889 | A2 | 4/2006 |
| WO | 2015081387 | A1 | 6/2015 |

* cited by examiner

SAFETY DEVICE

FIELD OF THE INVENTION

The present invention relates in general to the field of providing safety for workers in relation to construction of structures. More specifically, the present invention relates in a first aspect to a safety device for securing an individual to a concrete element of a structure. In a second aspect the present invention relates to a safety system comprising one or more safety devices according to the first aspect in combination with one or more safety lines. The present invention relates in a third aspect to a use of a safety device according to the first aspect, or of a safety system according to the second aspect for providing safety to an individual against fall accidents.

BACKGROUND OF THE INVENTION

For decades it has been customary in construction of structures, such as building for homes or offices to assemble a number of prefabricated concrete elements. These prefabricated concrete elements may either have standard dimensions and geometries or they may have been customarily designed with the view to fit a very specific design of the structure to be built.

The prefabricated concrete elements are made by casting steel reinforced concrete into a desired shape.

As it is necessary to be able to move around the cast concrete elements lifting means are included in the casting process of the elements. Such lifting means typically comprises a lifting pin having an enlarged head. The lifting pin is being arranged in the concrete body in a surrounding hole in the body so that the enlarged head of the lifting pin is arranged in a recessed fashion relative to the surface of the concrete element, i.e. below the surface of the element.

Upon assembling multiple prefabricated concrete elements into a building, one floor level is being assembled at a time. That is, once wall sections have been erected, a horizontal deck is arranged on top of the wall sections by arranging a plurality of concrete elements horizontally next to each other and subsequently, this process is successively repeated in respect of floors at higher floor levels.

Upon assembling the horizontal deck by mounting a plurality of concrete elements on top of a number of wall sections it will be necessary for workers to move around on top of the newly arranged concrete sections of the horizontal deck in order to assist in assembling the deck and the wall sections supporting the next floor level of the structure.

However, in doing so, these workers are highly exposed to hazards involving risk of falling off the horizontal deck because no scaffolds or sides of the horizontal deck has yet been mounted and because no anchoring point above the floor level onto which the workers are moving around, will at this time be available for fastening a safety line.

In order to minimize such hazards and in order to comply with various safety regulations it is customary to mount temporarily arranged safety devices onto the floor of the deck.

In order to obtain optimum security, these temporarily safety devices must be mounted on each concrete element of the concrete floor upon forming the deck from a plurality of concrete elements.

Such temporarily arranged safety devices typically comprises a baseplate from which a pole extends in a vertical direction above head level of the workers. The pole comprises in its upper part fixation means for fixing an end of one or more safety lines. The baseplate is configured for being bolted into expandable bushing arranged in holes in the body of the concrete deck. These holes are drilled ad hoc at desired positions of the concrete deck.

Once being fixed by bolts the prior art safety device allows a worker to be fixed, via a safety line to an upper part of the vertical pole. The safety line will hence in one end be attached to an upper part of the pole and will, in an opposite end, be attached to a safety harness worn by the worker.

Although such types of safety devices have proven valuable in minimizing the risk of fall accidents, these safety devices nevertheless present some disadvantages.

One of these disadvantages is that, seeing that the safety device is only going to serve its purpose temporarily, i.e. until the horizontal deck has been provided with scaffold or wall elements, the process of drilling holes into the deck and subsequently bolting bolts into these holes is a time-consuming process. Moreover, as it is customary to cast concrete elements with a plurality of longitudinally arranged air pockets, there is a risk that the hole being drilled into the concrete deck will enter such an air pocket, thereby weakening the attachment of the inserted bushing and the bolt holding the safety device. In addition, any stresses imposed on such bolted in safety devices may imply weakening of the concrete located in vicinity of the bolts fastening the safety device in the concrete, thereby reducing the overall structural integrity of the formed deck.

In any event, drilling holes into a prefabricated concrete block will, everything else being equal, result in a weakening of the structural integrity of the element.

Accordingly, a need persists for an improved safety device which overcomes the disadvantaged of the prior art.

It is an objective of the present invention to fulfill such need.

BRIEF DESCRIPTION OF THE INVENTION

This objective is fulfilled according to the first, the second and the third aspect of the present invention.

Accordingly, the present invention relates in a first aspect to a safety device for securing an individual to a concrete element of a structure during construction work, wherein said concrete element is of the type comprising a concrete body having one or more lifting pins embedded in respective lifting pin holes in said body; wherein said safety device in the orientation intended during use comprises:

an anchoring element; and a top element;

wherein said anchoring element comprises engagement means configured to releasably engage with the head of a lifting pin of the type comprising a longitudinal stem and a head arranged in an upper end of said stem, said head of said lifting pin is having a larger extension, compared to said stem, in a transversal direction; so as to enable said anchoring element and said lifting pin to shift configuration between an engaged configuration with each other and a disengaged configuration and vice versa;

wherein said anchoring element comprises a first fastening means configured to be connected to said top element;

wherein said top element comprises a second fastening means configured to be connected to said anchoring element;

wherein said safety device comprises fixation means for fixing a safety line thereto.

In a second aspect the present invention relates to a safety system comprising one or more safety devices according to the first aspect of the invention in combination with one or more safety lines adapted to be connected to said fixation means.

In a third aspect the present invention provides the use of a safety device according to the first aspect of the invention, or of a safety system according to the second aspect of the invention for providing safety to an individual against fall accidents.

The present invention provides an improved safety device which allows for fast and easy temporarily mounting to a concrete element during construction of a concrete floor made from such elements. With the device in some embodiments it is even possible to fasten a safety line at a height level above an average height of a worker involved in assembling the concrete elements.

The safety device of the present invention can be attached and detached to a concrete element without any use of tools and without the necessity to drill holes in the concrete element, thereby avoiding weakening the structural integrity of the concrete elements making up the deck of a structure.

DETAILED DESCRIPTION OF THE INVENTION

Figure 1:
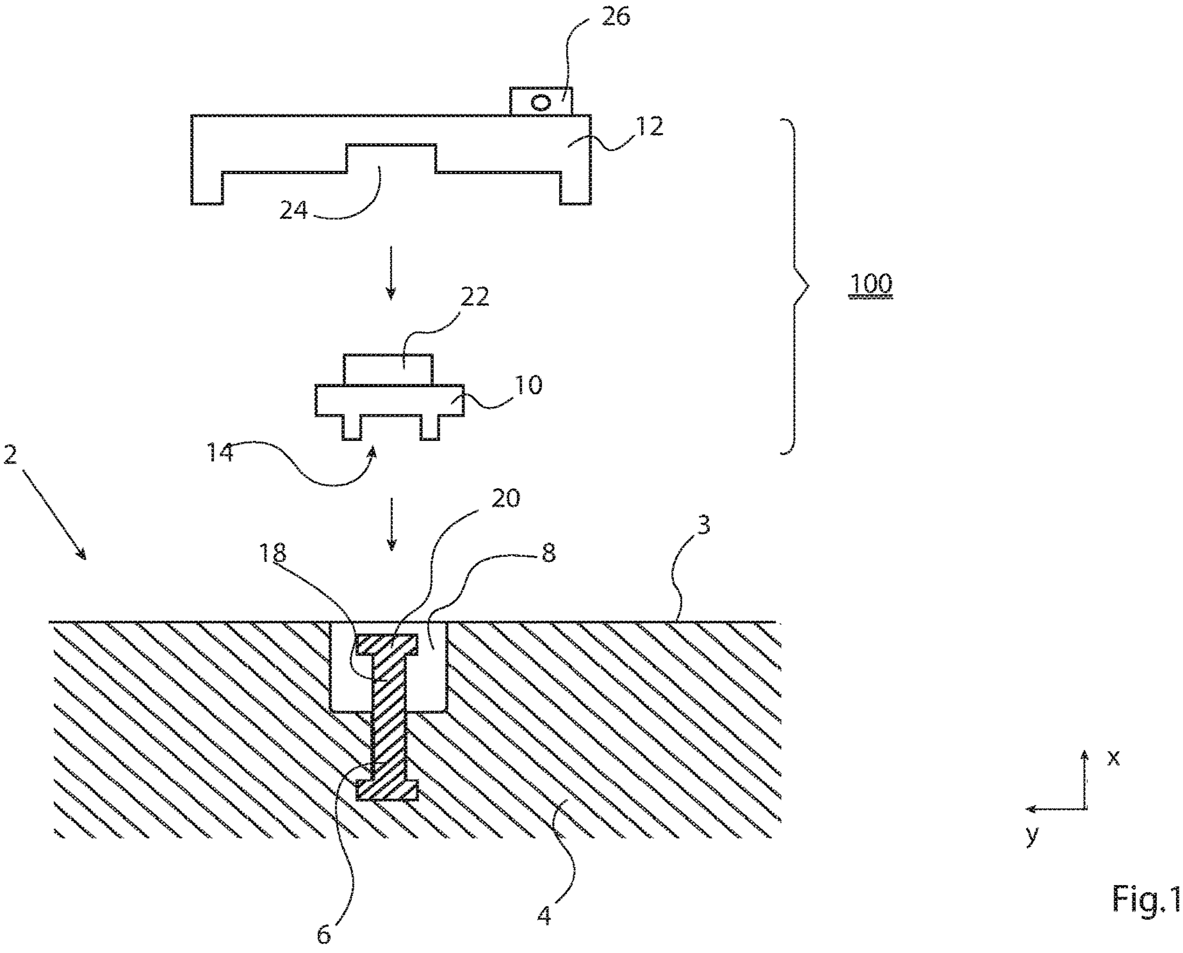
FIG. 1 is a schematic illustration of the working mode of the safety device of the present invention.

The First Aspect of the Present Invention

Accordingly, the first aspect of the present invention relates to a safety device for securing an individual to a concrete element of a structure during construction work, wherein said concrete element is of the type comprising a concrete body having one or more lifting pins embedded in respective lifting pin holes in said body; wherein said safety device in the orientation intended during use comprises:

an anchoring element; and a top element;

wherein said anchoring element comprises engagement means configured to releasably engage with the head of a lifting pin of the type comprising a longitudinal stem and a head arranged in an upper end of said stem, said head of said lifting pin is having a larger extension, compared to said stem, in a transversal direction; so as to enable said anchoring element and said lifting pin to shift configuration between an engaged configuration with each other and a disengaged configuration and vice versa;

wherein said anchoring element comprises a first fastening means configured to be connected to said top element;

wherein said top element comprises a second fastening means configured to be connected to said anchoring element;

wherein said safety device comprises fixation means for fixing a safety line thereto.

Accordingly, the present invention in its first aspect provides a safety device comprising an anchoring element in combination with a top element. The anchoring element configured to enter into engagement with the head of a lifting pin on a concrete element. The top element is configured to be arranged on top of the anchoring element.

In some embodiments the top element, when being arranged above the anchoring element, will ensure that the anchoring element and the lifting pin of the concrete element will not disengage from each other.

In the present description and in the appended claims the term “in the orientation during use” may be construed to mean an orientation in which the concrete element is essentially horizontally arranged and in which the lifting pin hole of the concrete element extends in a downward direction, so that the anchoring element can be engaged with the lifting pin and in such a way that the top element can be arranged on top of the anchoring element.

In the present description and in the appended claims the term “engaged configuration” may be construed to mean that the anchoring element is attached to the lifting pin in such a way that the anchoring element cannot be released from the lifting pin solely by moving the anchoring element in an upward direction.

In one embodiment of the safety device according to the first aspect of the present invention, the first fastening means of said anchoring element and said second fastening means of said top element are having geometries and dimensions in such a way that said top element is being adapted to retain said anchoring element in an engagement configuration with a lifting pin, once being in an engaged configuration with said lifting pin.

Hereby is ensured that once the anchoring element and the top element are arranged in relation to each other in the intended way, the anchoring element will remain in its engaged configuration relative to the lifting pin of the concrete element.

In one embodiment of the safety device according to the first aspect of the present invention, the safety device furthermore comprises a locking element for locking said top element to said anchoring element, once being in its engaged configuration with said lifting pin.

Hereby is ensured that the anchoring element and the top element cannot be separated from each other, as long as that locking element is locking these two elements to each other.

In one embodiment of the safety device according to the first aspect of the present invention, the top element comprises a base plate configured to rest on top of a concrete element, wherein said base plate comprises a through-going hole for accommodating at least part of said anchoring element.

Providing the top element with a base plate ensures a sturdy positioning of the top element on top of the anchoring element. The through-going hole of the base plate defines the second fastening means, thereby enabling fastening to the first fastening means of the anchoring element.

In one embodiment of the safety device according to the first aspect of the present invention, the base plate comprises an upright pole extending from said base plate, wherein said fixation means is being arranged at an upper portion of said upright pole.

Hereby, the fixation point for fixing a safety line can be arranged at an elevated height level, compared to the level of the concrete element, hereby providing enhanced safety.

In one embodiment of the safety device according to the first aspect of the present invention, the upright pole at a lower portion thereof is hollow, thereby forming one or more walls at a lower portion of said upright pole, and thereby defining an interior of said upright pole; wherein said upright pole is attached to said base plate in such a way that a passage is defined from outside and below said through-going hole of said base plate and into said interior of said upright pole.

Hereby part of the anchoring element may be accommodating in the interior of the upright pole, hence better enabling fastening of the anchoring element to the top element.

In one embodiment of the safety device according to the first aspect of the present invention, the second fastening means of said top element comprises one or more through-going openings in one or more of said walls of said upright pole, at a lower portion thereof.

Hereby, a locking element can be inserted through these through-going holes in the wall(s) of the upright pole, thereby enabling that locking element also to become fastened to the anchoring element when partly being accommodated in said interior of the upright pole.

In one embodiment of the safety device according to the first aspect of the present invention, the extension of said upright pole, in a vertical direction, is selected from the ranges 50-300 cm, such as 100-250 cm, e.g. 150-200 cm.

These height levels of the upright pole provide very good safety against fall accidents.

In one embodiment of the safety device according to the first aspect of the present invention, the safety device additionally comprising a locking element, such as a wedge-shaped locking element for locking said anchoring element to said top element by means of being inserted through one or more of said through-going openings in said one or more walls of said upright pole.

In one embodiment of the safety device according to the first aspect of the present invention, the fixation means comprises one or more fixation parts which are being fastened to said upright pole, such as via a bolt, in a swivelling fashion.

Hereby its is possible for two or more workers via individual safety lines to be attached to the same safety pole without too much risk of one safety line becoming entangled in another safety line.

In one embodiment of the safety device according to the first aspect of the present invention, the anchoring element comprises a portion having a convex surface, wherein said convex surface comprises a recess for accommodating the head of said lifting pin; wherein in respect of an outer portion of said convex surface, a first portion of said recess is having a larger width than a second portion of said recess, thereby enabling the head of a lifting pin to be inserted into said recess at said first portion, and further enabling said lifting pin to be slit along and relative to said recess in order to reach said second portion of said recess, thereby obtaining said engaged configuration between said anchoring element and said lifting pin.

Accordingly, in this embodiment the recess or at least the first portion thereof comprises the engagement means of the anchoring element.

This embodiment enables, in a very easy and safe way, bringing the anchoring element into an engaged configuration with a lifting pin.

In one embodiment of the safety device according to the first aspect of the present invention, the extension of said first portion of said recess, along the extension of said recess, is 5-40%, such as 10-35%, e.g. 15-30%, such as 20-25% of the total extension along said recess.

In one embodiment of the safety device according to the first aspect of the present invention, the extension of said second portion of said recess, along the extension of said recess, is 50-95%, such as 55-90%, e.g. 60-85%, such as 65-80% or 70-75% of the total extension along said recess.

These dimensions have proven suitable for the intended purpose.

In one embodiment of the safety device according to the first aspect of the present invention, the anchoring element comprises a first part and a second part; wherein said first part comprises said convex surface with said recess, and wherein said second part of said anchoring element comprises said first fastening means, such as in the form of a though-going hole in said second part.

Hereby it will be easy to use this embodiment of the anchoring element with the embodiment of the top element comprising a base plate and optionally also comprising an upright pole.

In one embodiment of the safety device according to the first aspect of the present invention, the first part and said second part of said safety device are connected to each other in a way enabling said first part and said second part of said anchoring element to be movable in relation to each other, such as being connected in a swivelling fashion.

This embodiment makes it easy to insert the second part of the anchoring element into the through-going hole of the base plate of a top element.

In one embodiment of the safety device according to the first aspect of the present invention, the anchoring element comprises a flap portion extending from said first part at a position opposite to said recess in such a way that when said flap portion is pointing in a horizontal direction, at least part of said second portion of said recess is pointing downward.

Hereby the flap portion will aid in retaining the orientation of the lifting pin relative to the recess of the convex surface when a top element is resting on top of this flap portion.

In one embodiment of the safety device according to the first aspect of the present invention, the anchoring element comprises a U-shaped member comprising a first part and a second part; wherein said first part of said anchoring element comprises said engagement means, and wherein said second part of said anchoring element comprises said first fastening means; wherein said engagement means of said anchoring element comprises a fork portion comprising a first fork member and a second fork member which are being separated from each other by a free space; wherein said first part and said second part of said anchoring element are being arranged at opposite ends of said U-shaped member.

In this embodiment the engagement means of the anchoring element thus comprises the first part comprising the two fork members of the fork portion and the free space therebetween. This design of the anchoring element constitutes a very simple design which is easy and cost efficient to manufacture and which yet provides for easy engagement with a lifting pin of a concrete element.

In one embodiment of this embodiment, the anchoring element and the lifting pin are configured in such a way that they are able to engage with each other by sliding the stem of said lifting pin relative to said fork portion into said free space between said first fork member and said second fork member.

In another embodiment of the safety device according to the first aspect of the present invention, the anchoring element comprises a lower part and an upper part; wherein said lower part defines a cavity for accommodating the head of a lifting pin; wherein said lower part comprises one or more hooks; wherein each said hook comprises one or more engagement parts; wherein each said hook is being pivotally suspended on said lower part; said anchoring element furthermore comprises a collar which is being arranged around said lower part in such a way that said collar is being displaceable along a longitudinal extension of said lower part; wherein said engagement means of said anchoring element comprises said collar and said one or more hooks; thereby allowing said anchoring element to shift configuration between said engaged configuration and said disengaged configuration, wherein said engaged configuration is attained by arranging the head of said lifting pin in the cavity of said lower part, subsequently pivot said one or more hook(s) in such a way that said one or more engagement parts are being arranged below said head, thereby preventing movement of said anchoring element away from said lifting pin, and finally displacing said collar downward so as to cover at least part of hook(s); and wherein said disengaged configuration is attained by displacing said collar in an upward direction and subsequently pivot said one or more hook(s) away from said lower part.

In this embodiment the engagement means of the anchoring element thus comprises the hooks and the corresponding engagement parts in combination with the collar.

In one embodiment of this embodiment, the number of hooks is 1, 2, 3, 4, 5 or 6.

In one embodiment of this embodiment, the number of protrusions on each hook is 1, 2, 3 or 4.

In one embodiment of the safety device according to the first aspect of the present invention, wherein the top element comprises a base plate and an associated upright pole, the dimensions and geometries of said anchoring element and of said top element are adapted to each other in such a way that at least said second part of said anchoring element is configured to be accommodated in said through-going hole in said base plate, thereby retaining said anchoring element in its engaged configuration.

In one embodiment of this embodiment the dimensions and geometries of said anchoring element and of said top element are adapted to each other in a way enabling that a locking element may be inserted through one or more of said through-going opening(s) of said wall of said upright pole and through said first fastening means of said anchoring element.

In one embodiment of the safety device according to the first aspect of the present invention, the safety device additionally comprising a locking element, such as a wedge-shaped locking element, and optionally also comprising a split for retaining said locking element place in said through-going opening(s).

Hereby any unintentional disengagement of the top element with the anchoring element can be avoided.

In one embodiment of the safety device according to the first aspect of the present invention, the anchoring element and/or said top element independently is being made from a material or an alloy, such as aluminium or steel, or of a fibre reinforced polymer, such as carbonfibre reinforced epoxy or poly-para-phenylene terephthalamide (Kevlar®) reinforced epoxy.

These materials have proven beneficial for the intended purpose.

In one embodiment of the safety device according to the first aspect of the present invention, the fixation means is comprising a through-going hole of said top element for attachment of a safety line.

In one embodiment of the safety device according to the first aspect of the present invention, the anchoring element is having geometries and dimensions enabling said anchoring element to shift between an engaged configuration and a disengaged configuration, and vice versa, with a lifting pin having a maximum stem width selected from the ranges of 5-70 mm, such as 10-65 mm, for example 15-60 mm, such as 20-55 mm, for example 25-50 mm, such as 30-45 mm or 40-45 mm.

In one embodiment of the safety device according to the first aspect of the present invention, the anchoring element is having geometries and dimensions enabling said anchoring element to shift between an engaged configuration and a disengaged configuration, and vice versa, with a lifting pin having a maximum head width selected from the ranges of 8-60 mm, such as 10-55 mm, for example 15-50 mm, such as 20-45 mm, e.g. 25-40 mm or 30-35 mm.

Such dimensions of the lifting pin is typically encountered within the construction industry.

In one embodiment of the safety device according to the first aspect of the present invention, the anchoring element is having geometries and dimensions enabling said anchoring element to shift between an engaged configuration and a disengaged configuration, and vice versa, with a lifting pin embedded in a lifting pin hole in a concrete body, wherein said lifting pin hole is having a maximum width selected from the ranges of 50-300 mm, such as 60-250 mm, for example 70-200 mm, e.g. 80-175 mm, for example 90-150 mm, such as 100-140 mm or 120-130 mm.

In one embodiment of the safety device according to the first aspect of the present invention, the anchoring element is having geometries and dimensions enabling said anchoring element to shift between an engaged configuration and a disengaged configuration, and vice versa, with a lifting pin embedded in a lifting pin hole in a concrete body, wherein said lifting pin hole is having a maximum depth selected from the ranges of 50-200 mm, such as 75-180 mm, e.g. 90-175 mm, such as 100-160 mm, such as 125-150 mm.

Such dimensions of the lifting pin hole is typically encountered within the construction industry.

The Second Aspect of the Present Invention

In a second aspect the present invention relates to a safety system comprising one or more safety devices according to the first aspect of the invention in combination with one or more safety lines adapted to be connected to said fixation means.

In one embodiment of the safety system according to the second aspect of the present invention, the system further comprising one or more harnesses configured to be worn by a human individual.

The Third Aspect of the Present Invention

In a third aspect the present invention provides the use of a safety device according to the first aspect of the invention, or of a safety system according to the second aspect of the invention for providing safety to an individual against fall accidents.

Referring now to the figures for better illustrating the present invention FIG. 1 is a schematic illustration of the general working mode of the safety device of the present invention.

FIG. 1 shows that a concrete element 2 comprising a concrete body 4 having embedded therein a lifting pin 6. The lifting pin 6 is having a longitudinal extension in a vertical direction (X). The lifting pin 6 comprises a stem 18 and a head 20 arranged at an upper end of the stem.

It is seen in FIG. 1 that the head 20 of the lifting pin is having a larger extension in a direction (Y) transverse to the longitudinal extension (X), compared to the extension of the stem 18 in the same transversal direction (Y).

The lifting pin 6 is arranged in a lifting pin hole 8 which has been made upon casting the concrete element 2. The head 20 of the lifting pin 6 is arranged at a lower level than the surface 3 of the concrete element 2.

The arrangement of a plurality of such lifting pins 6 embedded in a concrete element allows for lifting the concrete element in the construction of structures, such as buildings. To this end a specially adapted lifting hook is used. The lifting hook comprises an engagement means which is configured to be detachably brought into engagement with the head 20 of the lifting pin 6.

FIG. 1 schematically illustrates the components of the safety device 100 according to the first aspect of the present invention.

The safety system comprises an anchoring element 10 and a top element 12. The anchoring element 10 comprises engagement means 14 which is configured to releasably engage with the head 20 of a lifting pin 6.

The specific design of the engagement means 14 of the anchoring element can attain a variety of different embodiments. However, typically and generally the engagement means 14 will be designed in such a way that it allows the anchoring element 10 to be approach to the head 20 of the lifting pin 6 in one orientation and further allows subsequent rotation and/or displacement of the anchoring element 10 relative to the head 20 of the lifting pin 6, thereby making the anchoring element 10 engage with the head 20 of the lifting pin 6.

The anchoring element furthermore comprises first fastening means 22. These first fastening means 22 are configured to be fastened to second fastening means 24 arranged at the top element 12

As seen in FIG. 1 the safety device 100 comprises fixation means 26 for attaching a safety line to the device 100.

In use, the engagement means 14 of the anchoring element 10 will be brought into engagement with the head 20 of the lifting pin 6 embedded in the body 4 of the concrete element 2. Subsequently the top element 12 will be arranged on top of the anchoring element 10 in such a way that the first fastening means 22 of the anchoring element is brought into contact with the second fastening means 24 of the top element 12. This contact will retain the engagement means 14 of the anchoring element in an engaged configuration relative to head 20 of the lifting pin. A locking element may be used to lock the top element 12 to the anchoring element 10, thereby ensuring that the engagement means 14 will not unintentionally disengage from the head 20 of the lifting pin 6, such as by an unintentional movement of the anchoring element 10.

Figure 2:
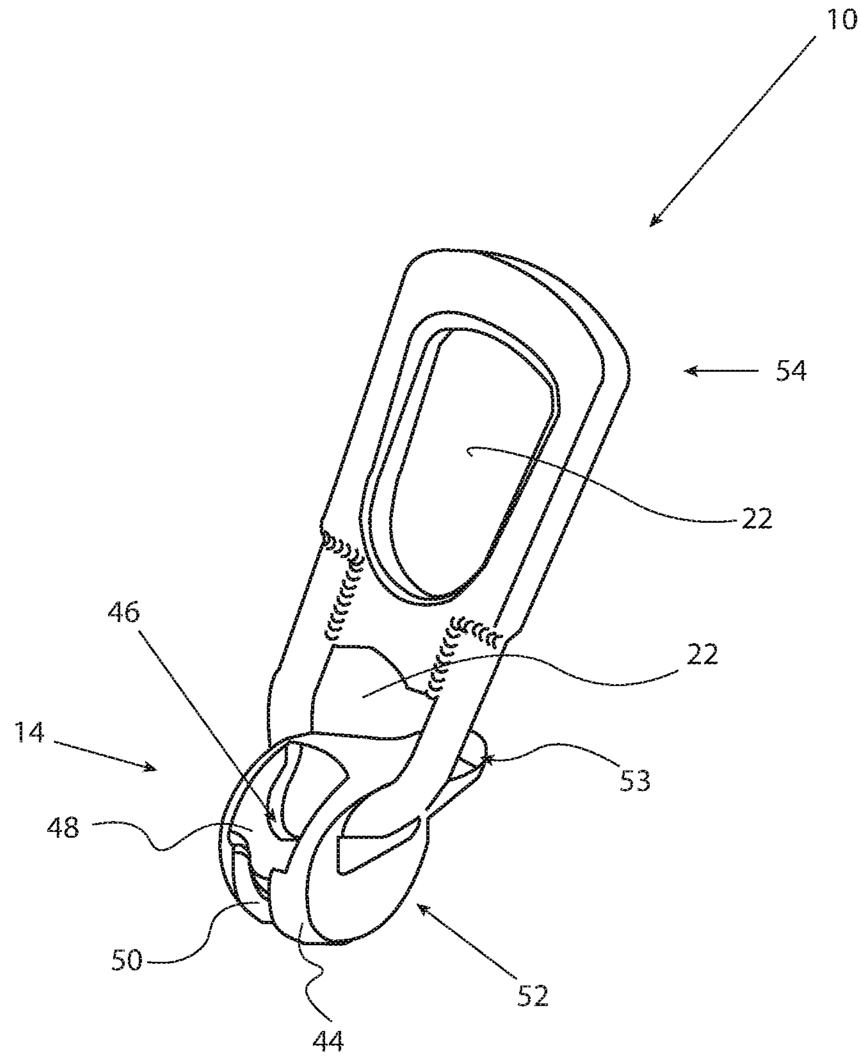
FIG. 2 is a perspective view of one embodiment of the anchoring element of the device of the present invention.

FIG. 2 is a perspective view of one embodiment of the anchoring element of the device of the present invention.

FIG. 2 shows the anchoring element 10 comprising a first part 52 and a second part 54 which are movable in a swiveling fashion in relation to each other, yet they are connected to each other.

The first part 52 of the anchoring element 10 comprises a portion having a convex surface. The convex surface comprises a recess 46 for accommodating the head 20 of a lifting pin 6. It is seen that in respect of an outer portion of the convex surface 44, a first portion 48 of the recess 46 is having a larger width than a second portion 50 of the recess 46, Hereby is enabled that the head 20 of a lifting pin 6 can be inserted into the recess 46 at the first portion 48, and further be slit relative to and along that recess 46 in order to reach the second portion 50 of the recess. Hereby the head 20 of the lifting pin 6 will have entered into engagement with the engagement means 14 of the anchoring element 10.

FIG. 2 also shows that the second part 54 of the anchoring element 10 comprises two through-going holes. These holes each represents the first fastening means 22 of the anchoring element.

The device illustrated in FIG. 2 is commercially available as a lifting hook for lifting concrete elements and it is marketed inter alia by the company Halfen.

Figure 3:
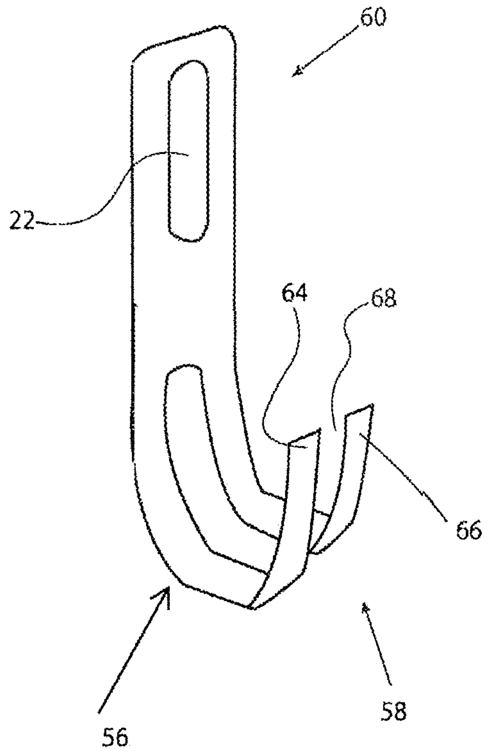
FIG. 3 is perspective view of another embodiment of the anchoring element of the device of the present invention.

FIG. 3 is perspective view of another embodiment of the anchoring element of the device of the present invention.

FIG. 3 shows that the anchoring element 10 comprises a U-shaped member 56 comprising a first part 58 and a second part 60. The first part 58 and the second part 60 of the anchoring element 10 are being arranged at opposite ends of said U-shaped member 56. The first part 58 of the anchoring element 10 comprises the engagement means 14 in the form of a fork portion 62 comprising a first fork member 64 and a second fork member 66 which are being separated from each other by a free space 68.

The anchoring element 10 illustrated in FIG. 3 is configured in such a way that it is able to engage with a lifting pin 6 by sliding the stem 18 of the lifting pin 6 relative to the fork portion 62 into the free space 68 between the first fork member 64 and the second fork member 66. By sliding the anchoring element 10 relative to the pin 6 the pin 6 can be brought to a position corresponding to the "bottom" of the U-shaped member.

Hereby the engagement means 14 of the anchoring element 10 illustrated in FIG. 3 will be brought into engagement with the pin 6.

The second part 60 of the anchoring element 10 comprises a first fastening means 22 in the form of a through-going hole. This hole is configured for being fastened to the top element 12 arranged on top of the anchoring element 10.

FIGS. **4*a*, 4*b*, 4*c*, 4*d* and 4*e*** are side view, plan views and cross-sectional views, respectively illustrating a specific embodiment of the top element of the safety device according to the present invention.

FIG. **4*a* illustrates the top element 12 of the device 100 of the first aspect of the present invention. The top element 12 comprises a top element 12 comprising a base plate 30 configured to rest on top of a concrete element 2, wherein the base plate 30 comprises a through-going hole 32 for accommodate at least part of the anchoring element 10** of the device.

An upright pole 34 extends from the base plate 30. Fixation means 26 is being arranged at an upper portion 36 of said upright pole. The fixation means 26 allows for easy fixing a safety line to the pole.

A through-going opening 43 is provided in the wall 40 of the pole 34. Through this opening 43 is inserted a locking element 28 for locking the anchoring element 10 to the top element 12.

Figure 4A:
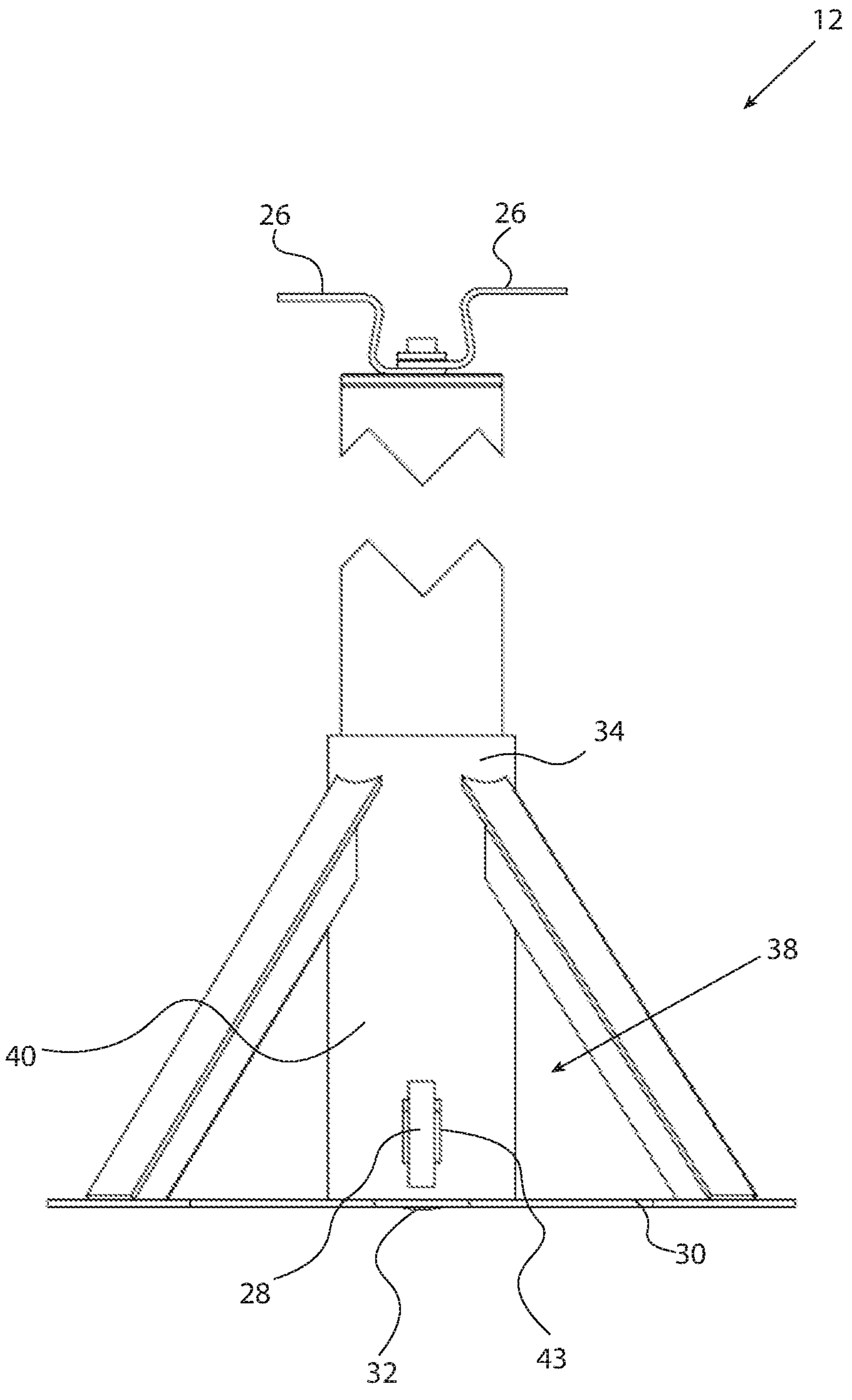
FIG. 4*a* is a side view illustrating an embodiment of a top element of the safety device according to the present invention.
Figure 4B:
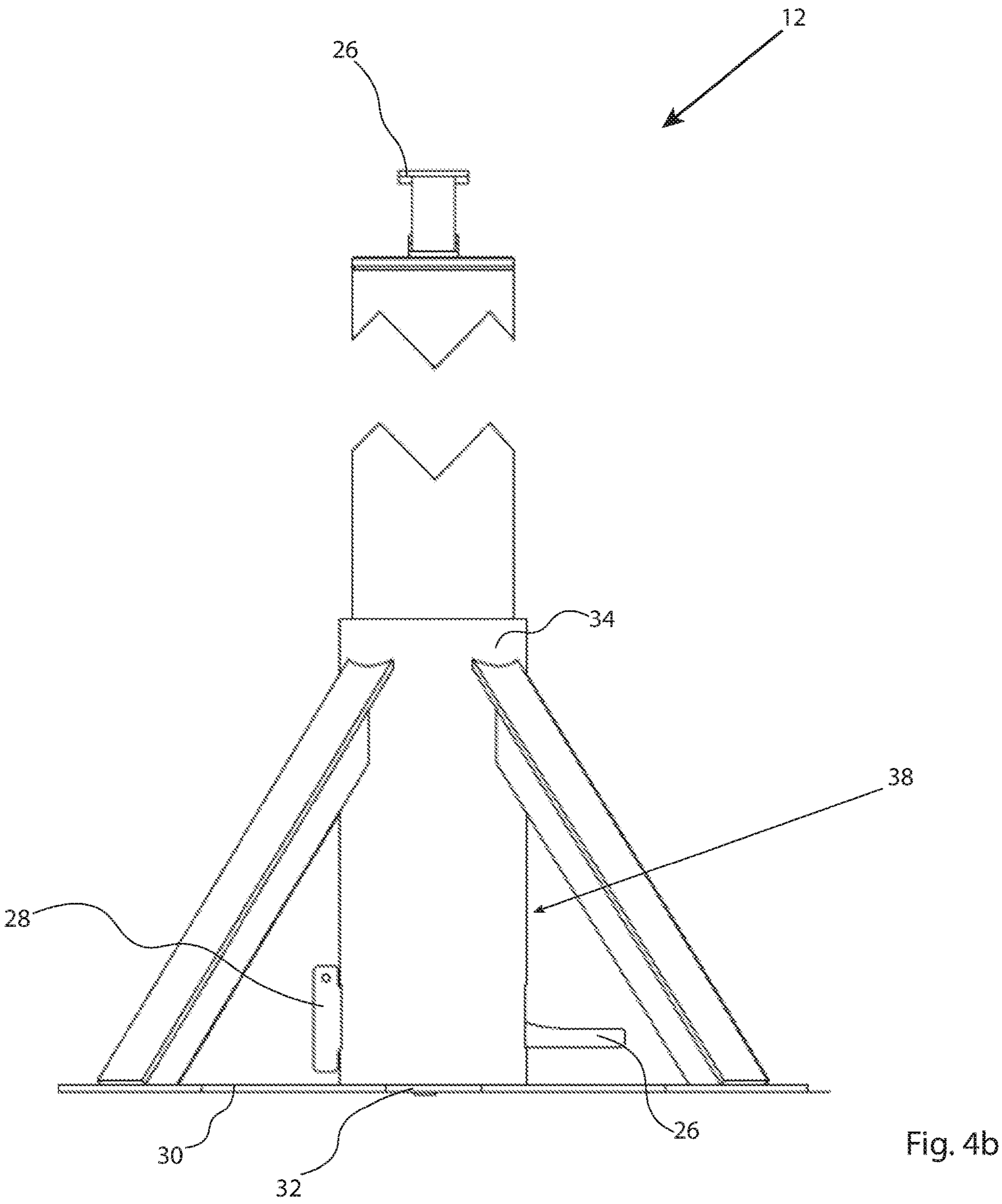
FIG. 4*b* is a side view illustrating the embodiment of FIG. 4*a* as seen from another viewing angle.

FIG. **4*b* illustrates the embodiment of FIG. 4*a* from a perspective rotated 90° relative to the perspective of FIG. 4*a***.

Figure 4C:
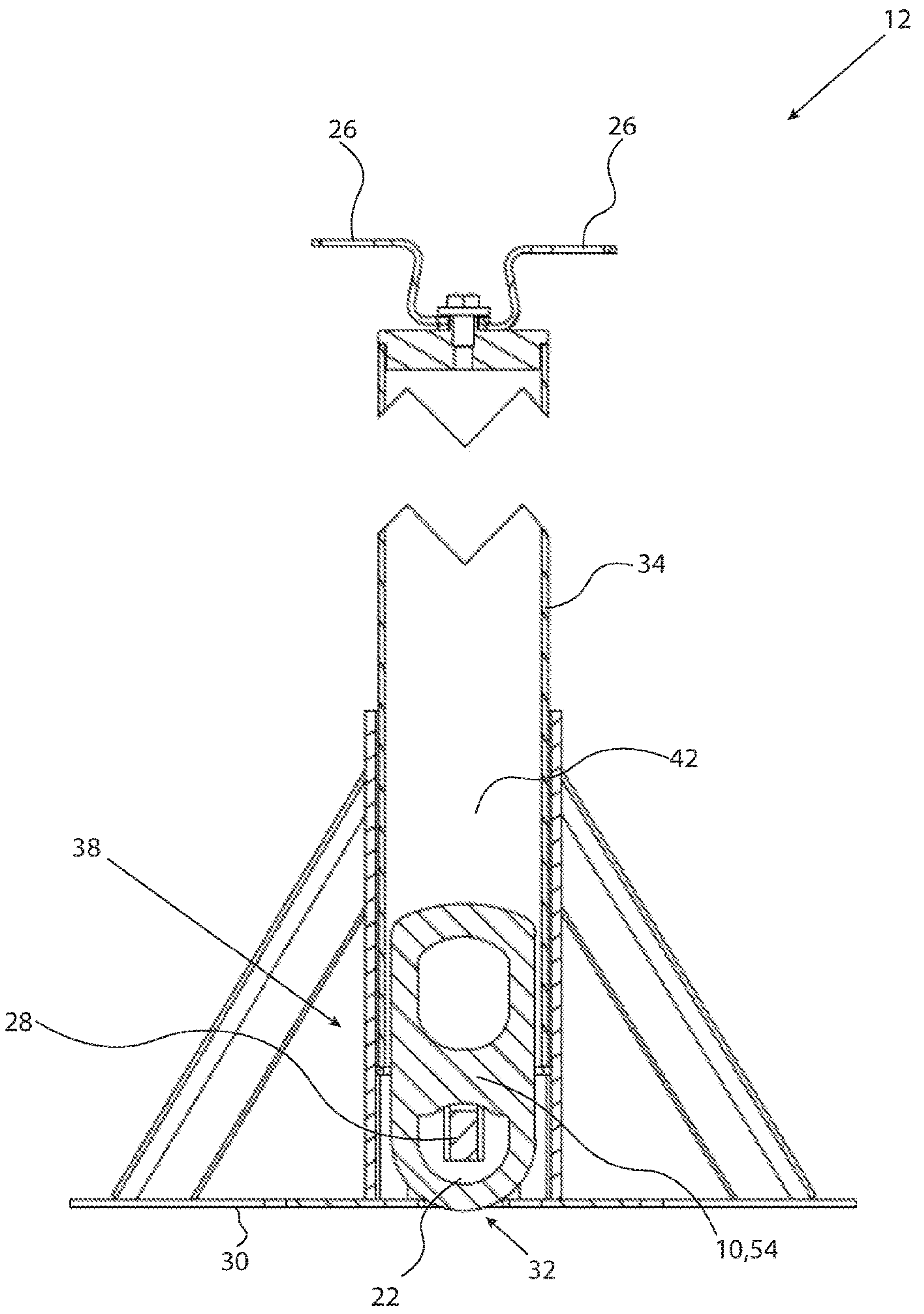
FIG. 4*c* is a cross-sectional view illustrating the embodiment of FIG. 4*a.*

FIG. **4*c* is a cross-sectional view illustrating the embodiment of FIG. 4*a*. In FIG. 4*c* it is seen that a second part 54 of an anchoring element 10 has been inserted through the through-going hole 32 in the base plate 30 of the top element 12. Moreover, a locking element 28 has been inserted through the wall of the pole 34 via the through-going openings 43 in the wall and via the first fastening means 22 of the anchoring element 10. Hereby is prevented that the top element 12** can be lifted from the supporting surface.

Figure 4D:
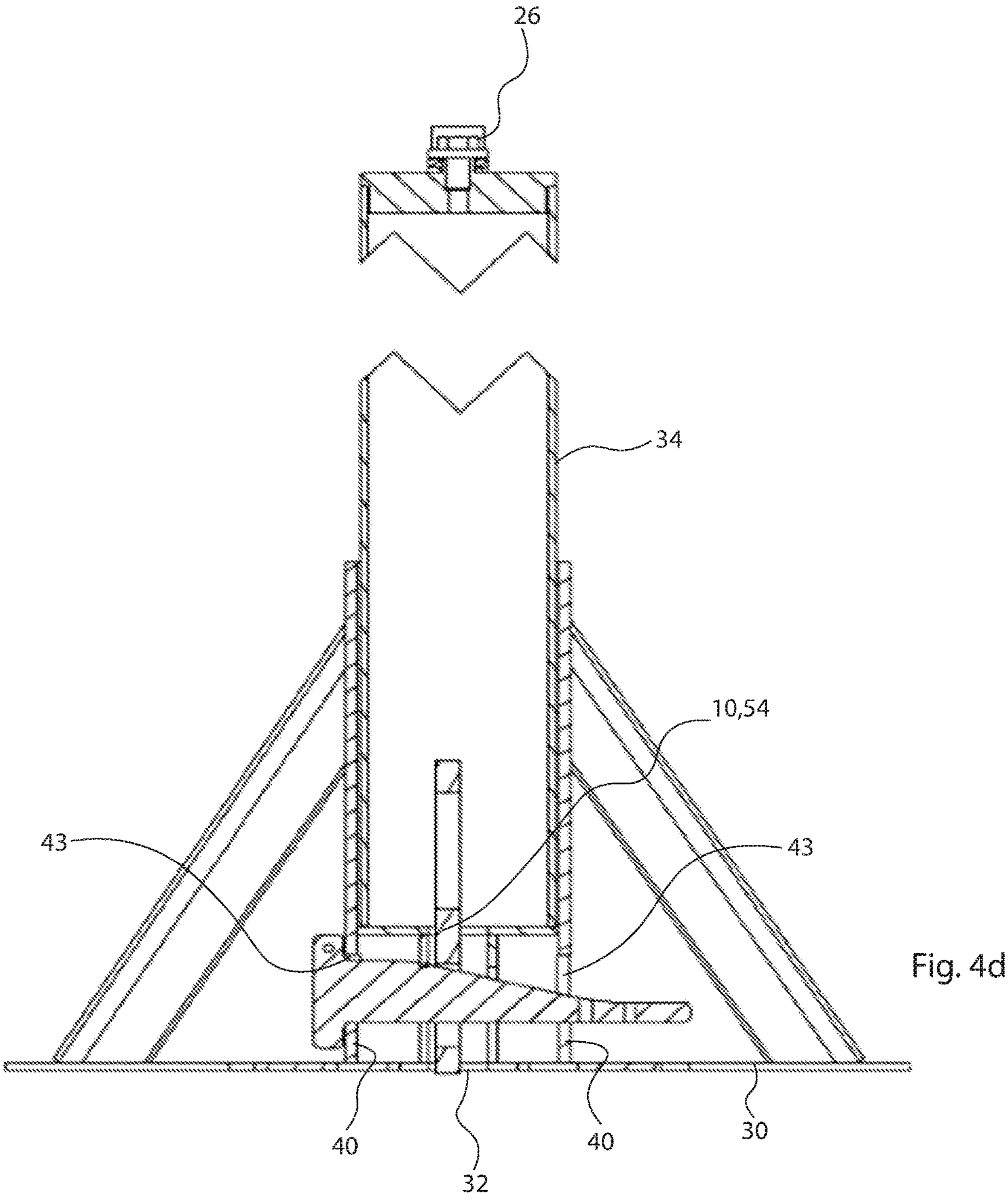
FIG. 4*d* is a cross-sectional view illustrating the embodiment of FIG. 4*a* cut at another angle.

FIG. 4*d* is a cross-sectional representing a cut rotated 90° relative to the cut as seen in FIG. 4*c*.

Figure 4E:
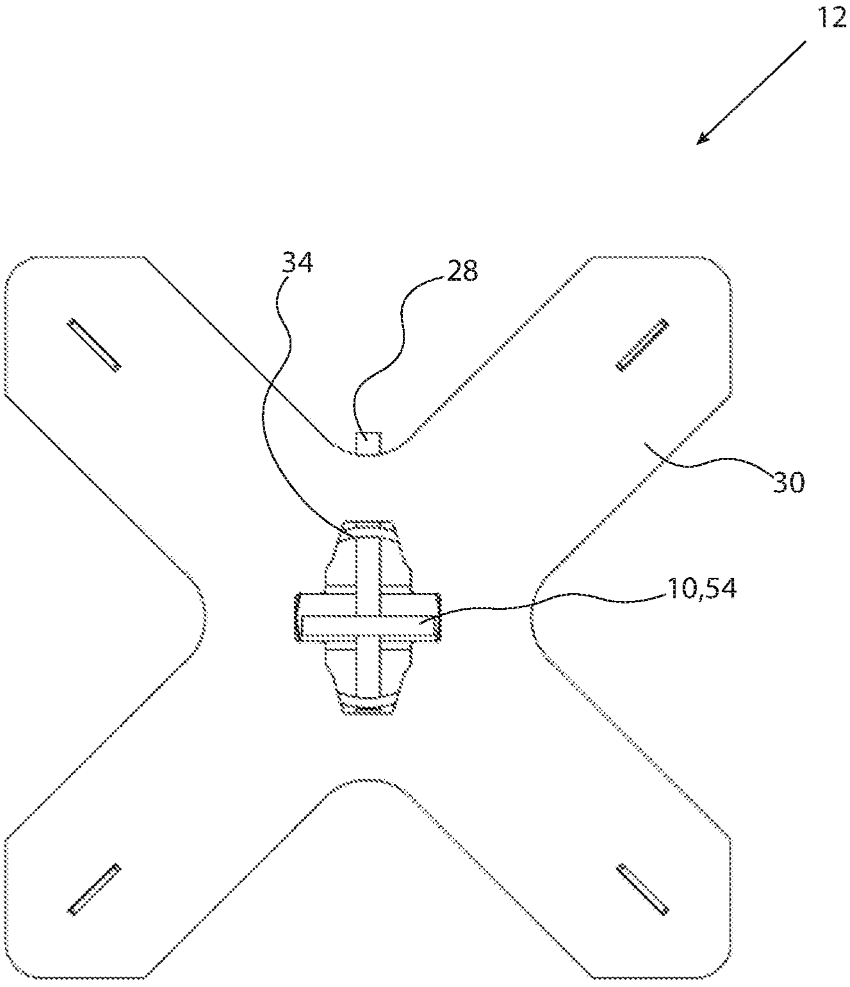
FIG. 4*e* is a plan view illustrating the embodiment of FIG. 4*a* as seen from below.

FIG. 4*e* is a plan view illustrating the top element 12 as seen from below.

Figure 5:
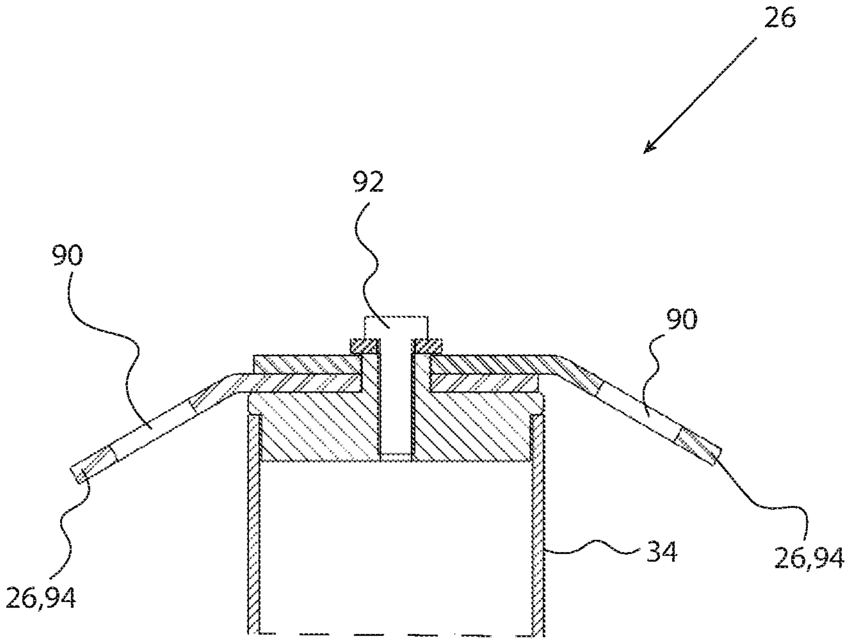
FIG. 5 is a cross-sectional view illustrating an embodiment of a fixation means to be used with the safety device according to the present invention.

FIG. 5 is a cross-sectional view illustrating an embodiment of a fixation means to be used with the safety device according to the present invention.

FIG. 5 shows an upper part of the upright pole 34 comprising the fixation means 26. The fixation means 26 comprises two fixation parts 94 which are being fastened to said upright pole 34 via the bolt 92, in a swivelling fashion. The fixation parts each comprises a through-going hole 90 for fixing a safety line.

Figure 6:
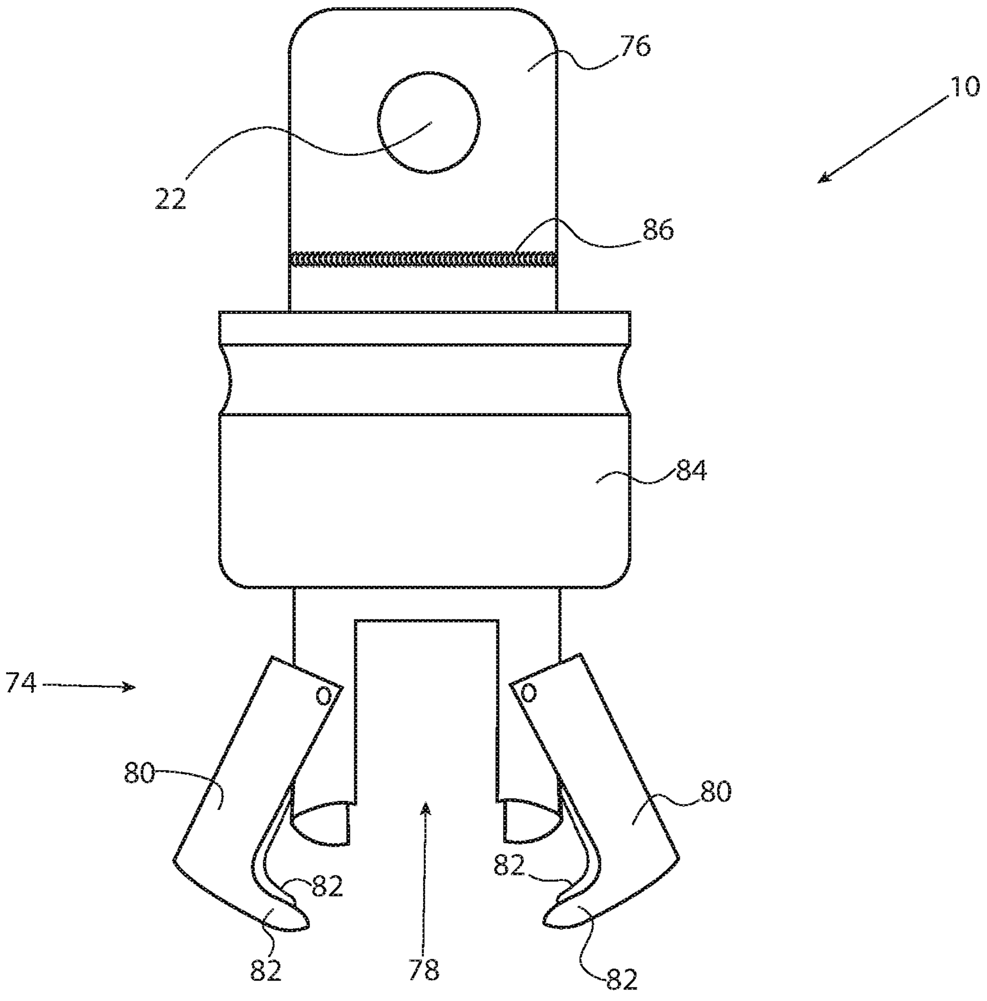
FIG. 6 is a plan view illustrating yet another embodiment of an anchoring element of the safety device according to the present invention.

FIG. 6 is a plan view illustrating yet another embodiment of an anchoring element of the safety device according to the present invention.

The anchoring element 10 comprises a lower part 74 and an upper part 76. These two parts are being attached to each other by a weld 86. The lower part 74 defines a cavity 78 in the interior thereof. The cavity 78 is for accommodating the head of a lifting pin 6.

The lower part 74 comprises two hooks 80; wherein each hook 80 two engagement parts 82. Each said hook 80 is being pivotally suspended on the part 74.

The anchoring element furthermore comprises a collar 84 which is being arranged around the lower part 74 in such a way that the collar is being displaceable along a longitudinal extension of the lower part 74.

The engagement means of the anchoring element comprises the collar 84 and the two hooks 80; thereby allowing the anchoring element 10 to shift configuration between the engaged configuration and the disengaged configuration.

The engaged configuration of the anchoring element illustrated in FIG. 6 is attained by arranging the head 20 of a lifting pin 6 in the cavity 78 of the lower part 74, and subsequently pivot the two hooks in such a way that the engagement parts 82 are being arranged below the head 20, thereby preventing movement of the anchoring element 10 away from the lifting pin 6. Finally, the collar 86 is displaced downward, so as to cover at least part of hooks 80.

The disengaged configuration is attained by displacing the collar 84 in an upward direction and subsequently pivot the two hooks away from the lower part 74.

LIST OF REFERENCE NUMERALS

2 Concrete element
3 Surface of concrete element
4 Concrete body
6 Lifting pin
8 Lifting pin hole in concrete body
10 Anchoring element
12 Top element
14 Engagement means of anchoring element
16 Longitudinal stem of lifting pin
18 Stem of lifting pin
20 Head of lifting pin
22 First fastening means of said anchoring element
24 Second fastening means of said top element
26 Fixation means
28 Locking element
30 Base plate of top element
32 Through-going hole of base plate
34 Upright pole of top element
36 Upper portion of upright pole
38 Lower portion of upright pole
40 Wall at lower portion of upright pole
42 Interior in hollow portion of upright pole
43 Through-going opening in wall at lower portion of upright pole
44 Portion of anchoring element having a convex surface
46 Recess in convex surface
48 First portion of recess
50 Second portion of recess
52 First part of anchoring element
53 Flap portion of anchoring element
54 Second part of anchoring element
56 U-shaped anchoring element
58 First part of U-shaped anchoring element
60 Second part of anchoring element
62 Fork portion of engagement means of anchoring element
64 First fork member of fork portion
66 Second fork member of fork portion
68 Free space between fork members
70,72 Opposite ends of U-shaped member
74 Lower part of anchoring part
76 Upper part anchoring element
78 Cavity of lower part of anchoring element
80 Hook of anchoring element
82 Engagement part of anchoring element
84 Collar
86 Weld
90 Hole of fixation means
92 Bolt for holding fixation means
94 Fixation part
100 Safety device

The invention claimed is:

1. A safety device (100) for securing an individual to a concrete element (2) of a structure during construction work, wherein said concrete element (2) is of the type comprising a concrete body (4) having one or more lifting pins (6) embedded in respective lifting pin holes (8) in said body; wherein said safety device comprises:

an anchoring element (10); and a top element (12);

wherein said anchoring element (10) comprises engagement means (14) configured to releasably engage with the head of a lifting pin of the type comprising a longitudinal stem (18) and a head (20) arranged at an upper end of said stem, said head (20) of said lifting pin (6) is having a larger extension, compared to said stem, in a transversal direction (Y); so as to enable said anchoring element (10) and said lifting pin (6) to shift configuration between an engaged configuration with each other and a disengaged configuration and vice versa;

wherein said anchoring element (10) further comprises a first fastening means (22) configured to be connected to said top element (12);

wherein said top element (12) comprises a second fastening means (24) configured to be connected to said anchoring element (10);

wherein said safety device comprises fixation means (26) for fixing a safety line thereto;

wherein said top element (12) comprises a base plate (30) configured to rest on top of a concrete element (2), wherein said base plate comprises a through-going hole (32) for accommodating at least part of said anchoring element (10);

wherein said base plate (30) comprises an upright pole (34) extending from said base plate (10), wherein said fixation means (26) is configured to be arranged at an upper portion (36) of said upright pole;

wherein said upright pole (34) at a lower portion (38) thereof is hollow, thereby forming one or more walls (40) at a lower portion (38) of said upright pole, and thereby defining an interior (42) of said upright pole; wherein said upright pole is attached to said base plate (30) in such a way that a passage is defined from outside and below said through-going hole (32) of said base plate and into said interior (42) of said upright pole;

wherein said second fastening means (24) of said top element (12) comprises one or more through-going openings (43) in one or more of said walls (40) of said upright pole (34), at a lower portion (38) thereof.

2. The safety device (100) according to claim 1, wherein said first fastening means (22) of said anchoring element (10) and said second fastening means (24) of said top element (12) are having geometries and dimensions in such a way that said top element is configured to be adapted to retain said anchoring element (10) in an engagement configuration with a lifting pin, once in an engaged configuration with said lifting pin (6).

3. The safety device (100) according to claim 1, wherein said safety device furthermore comprises a locking element (28) for locking said top element (12) to said anchoring element (10), once in its engaged configuration with said lifting pin (6).

4. The safety device (100) according to claim 1, additionally comprising a locking element (28) for locking said anchoring element (10) to said top element (12) by means of inserted through one or more of said through-going openings (43) in said one or more walls (40) of said upright pole (34).

5. The safety device (100) according to claim 4, wherein the locking element is a wedge-shaped locking element.

6. The safety device (100) according to claim 1, wherein said fixation means (26) comprises one or more fixation parts (94) which are configured to be fastened to said upright pole (34) in a swivelling fashion; or wherein said fixation means (26) is comprising a through-going hole (90) of said top element (12) for attachment of a safety line.

7. The safety device (100) according to claim 6, wherein the one or more fixation parts (94) is fastened to said upright pole (34) via a bolt (92).

8. The safety device (100) according to claim 1, wherein said anchoring element (10) comprises a portion (44) having a convex surface, wherein said convex surface comprises a recess (46), for accommodating the head (20) of said lifting pin (6); wherein in respect of an outer portion of said convex surface, a first portion (48) of said recess (46) is having a larger width than a second portion (50) of said recess (46), thereby enabling the head (20) of a lifting pin (6) to be inserted into said recess at said first portion (48), and further enabling said lifting pin (6) to be slit along and relative to said recess (46) in order to reach said second portion (50) of said recess, thereby obtaining said engaged configuration between said anchoring element (10) and said lifting pin (6).

9. The safety device (100) according to claim 8, wherein said anchoring element (10) comprises a first part (52) and a second part (54); wherein said first part comprises said convex surface (44) with said recess, and wherein said second part (54) of said anchoring element comprises said first fastening means (22).

10. The safety device (100) according to claim 9, wherein said first part (52) and said second part (54) of said safety device are connected to each other in a way enabling said first part (52) and said second part (54) of said anchoring element to be movable in relation to each other.

11. The safety device (100) according to claim 10, wherein said first part (52) and said second part (54) of said safety device are connected to each in a swivelling fashion.

12. The safety device (100) according to claim 9, wherein said anchoring element (10) comprises a flap portion (53) extending from said first part (52) at a position opposite to said recess (46) in such a way that when said flap portion (53) is pointing in a horizontal direction, at least part of said second portion (50) of said recess (46) is pointing downward.

13. The safety device (100) according to claim 9, wherein said first fastening means (22) is in the form of a through-going hole in said second part (54).

14. The safety device (100) according to claim 8, wherein the dimensions and geometries of said anchoring element (10) and of said top element (12) are adapted to each other in such a way that at least part of said second part (54, 60,76) of said anchoring element (10) is configured to be accommodated in said through-going hole (32) in said base plate (30), thereby retaining said anchoring element (10) in its engaged configuration.

15. The safety device (100) according to claim 14, wherein the dimensions and geometries of said anchoring element (10) and of said top element (12) are adapted to each other in a way enabling that a locking element (28) may be inserted through one or more of said through-going opening(s) (43) of said wall (40) of said upright pole (34) and through said first fastening means (22) of said anchoring element (10).

16. The safety device (100) according to claim 1, wherein said anchoring element (10) comprises a U-shaped member (56) comprising a first part (58) and a second part (60); wherein said first part of said anchoring element (10) comprises said engagement means (14), and wherein said second part (60) of said anchoring element (10) comprises said first fastening means (22); wherein said engagement means (14) of said anchoring element comprises a fork portion (62) comprising a first fork member (64) and a second fork member (66) which are configured to be separated from each other by a free space (68); wherein said first part (58) and said second part (60) of said anchoring element (10) are configured to be arranged at opposite ends of said U-shaped member (56).

17. The safety device (100) according to claim 16, wherein said anchoring element (10) and said lifting pin (6) are configured in such a way that they are able to engage with each other by sliding the stem (18) of said lifting pin (6) relative to said fork portion (62) into said free space (68) between said first fork member (64) and said second fork member (66).

18. The safety device (100) according to claim 16, wherein the dimensions and geometries of said anchoring element (10) and of said top element (12) are adapted to each other in such a way that at least part of said second part (54, 60,76) of said anchoring element (10) is configured to be accommodated in said through-going hole (32) in said base plate (30), thereby retaining said anchoring element (10) in its engaged configuration.

19. The safety device (100) according to claim 18, wherein the dimensions and geometries of said anchoring element (10) and of said top element (12) are adapted to each other in a way enabling that a locking element (28) may be inserted through one or more of said through-going opening(s) (43) of said wall (40) of said upright pole (34) and through said first fastening means (22) of said anchoring element (10).

20. The safety device (100) according to claim 1, wherein said anchoring element (10) comprises a lower part (74) and an upper part (76); wherein said lower part defines a cavity (78) for accommodating the head of the lifting pin (6); wherein said lower part comprises one or more hooks (80); wherein each said hook (80) comprises one or more engagement parts (82); wherein each said hook (80) is configured to be pivotally suspended on said lower part (74); said anchoring element furthermore comprises a collar (84) which is configured to be arranged around said lower part (74) in such a way that said collar is configured to be displaceable along a longitudinal extension of said lower part (74); wherein said engagement means (14) of said anchoring element (10) comprises said collar (84) and said one or more hooks (80); wherein said anchoring element (10) is configured to shift between said engaged configuration and said disengaged configuration, wherein in said engaged configuration the head (20) of said lifting pin (6) is configured to be arranged in the cavity (78) of said lower part (74), and said one or more hook(s) are configured to subsequently pivot in such a way that said one or more engagement parts (82) are configured to be arranged below said head (20), thereby preventing movement of said anchoring element (10) away from said lifting pin (6), and displacing said collar (84) downward so as to cover at least part of hook(s) (80); and wherein in said disengaged configuration said collar (84) is configured to be displaced in an upward direction and said one or more hook(s) (80) are configured to subsequently pivot away from said lower part (74).

21. The safety device (100) according to claim 20, wherein the dimensions and geometries of said anchoring element (10) and of said top element (12) are adapted to each other in such a way that at least part of said second part (54, 60,76) of said anchoring element (10) is configured to be accommodated in said through-going hole (32) in said base plate (30), thereby retaining said anchoring element (10) in its engaged configuration.

22. The safety device (100) according to claim 21, wherein the dimensions and geometries of said anchoring element (10) and of said top element (12) are adapted to each other in a way enabling that a locking element (28) may be inserted through one or more of said through-going opening(s) (43) of said wall (40) of said upright pole (34) and through said first fastening means (22) of said anchoring element (10).

23. A safety device (100) according to claim 1 additionally comprising a locking element (28) and also comprising a split for retaining said locking element (28) place in said through-going opening(s) (43).

24. The safety device (100) according to claim 23, wherein the locking element is a wedge-shaped locking element.

25. The safety device (100) according to claim 1, wherein said anchoring element (10) and/or said top element (12) independently is made from a material or an alloy or of a fibre reinforced polymer.

26. The safety device (100) according to claim 25, wherein the material or the alloy is aluminium or steel.

27. The safety device (100) according to claim 1, wherein said anchoring element (10) and said top element (12) are separate entities which are configured to become connected to each other; and/or wherein said device (100) comprises a locking element (28) as an entity separate from said anchoring element (10) and/or said top element (12).

28. The safety device (100) according to claim 25, wherein the fibre reinforced polymer is a carbonfibre reinforced epoxy or a poly-para-phenylene terephthalamide (Kevlar®) reinforced epoxy.

29. A safety system (200) comprising one or more safety devices (100) according to claim 1 in combination with one or more safety lines adapted to be connected to said fixation means (26).

30. The safety system (200) according to claim 29 further comprising one or more harnesses configured to be worn by a human individual.

31. A method for providing safety to an individual against fall accidents when moving around on a structure; said method comprising:

i) providing a safety system (200) according to claim 29;

ii) engaging said engagement means (14) of said anchoring element (10) of said safety device (100) of said safety system (200) with the head of a lifting pin of a concrete body (4) of said structure;

iii) connecting said top element (12) of said safety device (100) of said safety system (200) to said anchoring element (10) of said safety device (100);

iv) attaching one end of said one or more safety lines of said safety system (200) to said fixation means (26) of said safety device (100) of said safety system (200); and v) attaching the other end of said one or more safety lines of said safety system (200) to said individual.

* * * * *